United States Patent [19]

Wiesner

[11] Patent Number: 5,506,562
[45] Date of Patent: Apr. 9, 1996

[54] APPARATUS AND METHOD FOR DISABLING AN INTERNAL COMBUSTION ENGINE FROM A REMOTE LOCATION

[76] Inventor: Jerry C. Wiesner, 23-21 Steinway St., Astoria, N.Y. 11105

[21] Appl. No.: 400,535

[22] Filed: Mar. 8, 1995

Related U.S. Application Data

[63] Continuation of Ser. No. 91,906, Jul. 16, 1993, abandoned.

[51] Int. Cl.⁶ .................................................. B60Q 1/00
[52] U.S. Cl. .................... 340/425.5; 340/426; 340/428; 340/429; 307/10.2; 307/10.3; 180/287
[58] Field of Search .................... 340/426, 429, 340/430, 428, 427, 439, 425.5, 527, 528, 529; 307/10.1, 10.2, 10.3, 10.4; 180/287

[56] References Cited

U.S. PATENT DOCUMENTS

| | | | |
|---|---|---|---|
| 3,455,403 | 7/1969 | Hawthorne | 340/426 |
| 3,703,714 | 11/1972 | Andrews | 340/426 |
| 3,987,408 | 10/1976 | Sassoner et al. | 340/825.72 |
| 4,041,450 | 8/1977 | Knight | 340/426 |
| 4,067,411 | 1/1978 | Conley et al. | 340/426 |
| 4,227,588 | 10/1980 | Biancardi | 180/287 |
| 4,383,242 | 5/1983 | Sassover et al. | 340/543 |
| 4,446,460 | 5/1984 | Tholl et al. | 340/825.69 |
| 4,660,528 | 4/1987 | Buck | 307/10.2 |
| 4,855,710 | 8/1989 | Kikachi et al. | 340/426 |
| 4,857,888 | 8/1989 | Torres | 340/426 |
| 4,862,139 | 8/1989 | Fukamachi et al. | 340/426 |
| 4,876,649 | 10/1989 | Kawai et al. | 340/426 |
| 4,887,064 | 12/1989 | Drori et al. | 340/426 |
| 4,897,630 | 1/1990 | Nykerk | 340/426 |
| 4,901,054 | 2/1990 | Waterman | 340/426 |
| 4,933,664 | 6/1990 | Igawa et al. | 340/426 |
| 5,023,591 | 6/1991 | Edwards | 340/426 |
| 5,045,837 | 9/1991 | Gosker | 340/426 |
| 5,049,867 | 9/1991 | Stouffer | 340/426 |
| 5,054,569 | 10/1991 | Scott et al. | 340/502 |
| 5,146,215 | 9/1992 | Drori | 340/825.32 |
| 5,247,564 | 9/1993 | Zicker | 340/426 |
| 5,276,728 | 1/1994 | Pagliaroli et al. | 340/426 |
| 5,315,286 | 5/1994 | Nolan | 340/426 |

FOREIGN PATENT DOCUMENTS 2188463  9/1987  United Kingdom ................ 340/426

Primary Examiner—Brent A. Swarthout
Assistant Examiner—Nina Tong
Attorney, Agent, or Firm—Michael I. Kroll

[57] ABSTRACT

The present invention relates to a device for shutting off an engine remotely and sounding off an alarm locally and which includes an alarm motor, a module for activating the alarm motor, a key switch for turning the module on and off, a siren connected to the alarm motor, and a battery with an alternator terminal.

1 Claim, 4 Drawing Sheets

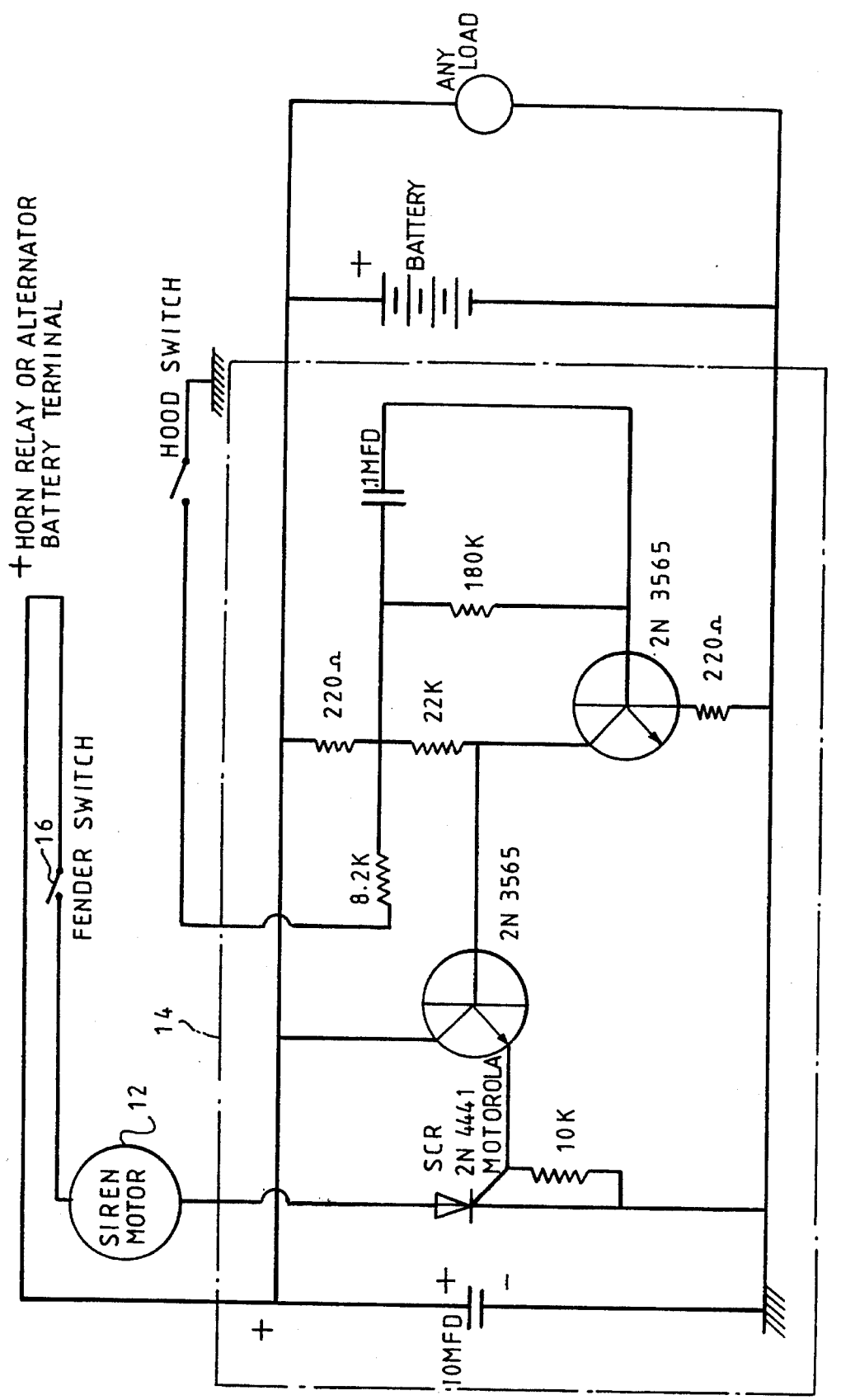

5,506,562

APPARATUS AND METHOD FOR DISABLING AN INTERNAL COMBUSTION ENGINE FROM A REMOTE LOCATION

This is a continuation of application Ser. No. 08/091,906, filed Jul. 16, 1993, now abandoned.

BACKGROUND OF THE INVENTION

1. Field of the Invention

The present invention relates to a guard.

More particularly, the present invention relates to a wise-guard.

2. Description of the Prior Art

Numerous innovations for guards have been provided in the prior art that are adapted to be used. Even though these innovations may be suitable for the specific individual purposes to which they address, they would not be suitable for the purposes of the present invention.

For example, U.S. Pat. No. 5,999,139 to Wong teaches an automobile engine starter that includes a controller for monitoring the internal temperature of the vehicle and generating a temperature signal when that temperature falls outside a predetermined range. The vehicle is also equipped with a mobile telephone or radio receiver that may receive a signal from a remote location to generate a remote starting signal that may be combined with the temperature signal to start the engine when both signals are present.

U.S. Pat. No. 4,296,334 to Wong teaches a programmable electronic starting device for automobiles and the like. The starting device incorporates means that are selectable to actuate automotive accessories. This device enables predetermined temperature functions and predetermined temperatures to be entered into programmable memories so that when certain temperatures are reached, the device is actuated and serves to start the engine, to allow the engine to run for a predetermined time, or until a predetermined temperature is reached, and to shut off the engine.

Canadian patent number 1,215,765 to Wong teaches an electronic programmable controller device that permits programs to be set to operate any electrical apparatus by means of programmed time setting or programed sensor settings. For example, temperature settings.

U.S. Pat. No. 5,054,569 to Scott et al. teaches a system for use in remotely starting a motor vehicle and operating vehicle accessories. It includes a remote unit having a digital controller which provides encoded digital command signals and a vehicle unit which receives the digital command signals and controllably operates the vehicles's engine and accessories in dependence thereon. The system is characterized by a frequency shift keying method of signal transmission independent of known carrier on, carrier off techniques.

U.S. Pat. No. 4,674,454 to Phairr teaches a remote control automobile engine starting apparatus that has a remote control unit with a transceiver for transmitting engine starting and automobile heater and air conditioner control signals to a remotely controlled starting circuit within the automobile. The starting circuit makes a first attempt at starting the automobile engine and, if the first attempt fails, a second attempt is automatically made. Safety features include a hood switch, automatic door locks and a timer for stopping the engine after it has run for a predetermined period of time.

U.S. Pat. No. 3,811,049 to Hildrith et al. teaches a remote engine starter having an auxiliary electrical circuit in parallel with the usual electrical circuit of an automobile. The auxiliary circuit is under control of a remote receiver.

U.S. Pat. No. 3,790,806 to Lessard teaches a remote engine starting system including a radio transmitter, the actuation of which initiates the timing of two preselected periods. The first of which controls the actuation of the engine cranking system until the engine is started and the second of which controls the period during which the engine will run.

U.S. Pat. No. 3,675,032 to Shaheen, U.S. Pat. No. 3,727,070 to Laang, and U.S. Pat. No. 2,632,120 to Gelbman, each teach remote automobile starting systems wherein electrical cables are connected between the remote control unit and the automobile engine.

U.S. Pat. No. 3,124,118 to Siebert teaches a remote control which starts an internal combustion engine upon the reception of a photoelectric signal.

U.S. Pat. No. 5,042,439 to Tholl et al. teaches an electromechanical apparatus and a method for remotely controlling the operation of an internal combustion engine. The apparatus uses state-of-the-art transmitting and receiving circuitry for secure sending and receiving of control command signals. Further security is provided by limiting engine operation, after starting, to an idling condition, limiting the time allowed to attempt to start an engine and to start and run the engine after generation of a control command signal. Providing control capability to actuate by the apparatus is by a remote command signal.

U.S. Pat No. 4,446,460 to Tholl et al. teaches an electrical apparatus and method for remotely starting an internal combustion engine. The apparatus is simplified and has transmitting circuitry that issues a predetermined set of coded signals, which selectively enable receiving circuitry and receiver control circuitry by which the engine is remotely started and accessories are remotely actuated.

Lastly, U.S. Pat No. 4,637,359 to Cook teaches an automatic starting and electronic detection system for remotely starting a vehicle and scanning the vehicle's electrical system components for explosives or to detect malfunctions. The system includes a clock and a remote-control receiver and transmitter combination which are electrically connected to the battery and operable to be energized for selectively connecting a current signal from the battery to the balance of the system including the starter circuit of the vehicle. The electronic detection device includes a cascade arrangement of timers for actuating various vehicle lights and accessories, and the vehicle's horn, in a predetermined sequence of sufficient duration to give a vehicle operator feedback for each step in the sequence.

SUMMARY OF THE INVENTION

Accordingly, it is an object of the present invention to provide a wise-guard that avoids the disadvantages of the prior art.

More particularly, it is an object of the present invention to provide an electromechanical system, including apparatus and method, which enables a user, at a remote location, to use a transmitter to selectively enable a receiver which in turn stops an internal combustion engine.

The receiver includes circuitry which insures that a correct signal has been received. Highly simplified, reliable, and an efficient power control circuit accurately causes the internal combustion engine to stop.

With the foregoing in mind, it is a primary object of the present invention to provide an improved electrical device for, and method of, remotely stopping an internal combustion engine.

An object also of significance is the provision of a novel device, the device including a highly simplified, efficient power control circuit.

In addition, it is a dominant object to provide a system for remotely stopping the internal combustion engine of an automobile, which system has a long expected life, is reliable, and is low cost so as to be economically available to all automobile owners.

It is another object of the present invention to provide a remote control device which prevents theft of the automobile, both prior and subsequent to starting of the engine.

The engine control and starter/stopper system includes a receiver for detecting the signals sent by the remote control unit to initiate starting/stopping of the engine.

The present invention also incorporates an automobile alarm system.

An automatic stopping system for a vehicle which includes the battery circuit, battery, and an internal combustion engine.

The present invention includes system deenergizing means which are electrically connectable to the battery of the vehicle. The system deenergizing means are selectively actuable for stopping a current signal from the battery.

In keeping with these objects, and with others which will become apparent hereinafter, one feature of the present invention resides, briefly stated, in a device for shutting off an engine remotely and sounding off an alarm locally, including an alarm motor, a module which activates the alarm motor, a key switch turning the module on and off, a siren connected to the alarm motor, and a battery with an alternator terminal.

In accordance with another feature of the present invention, it further includes a mounting bracket for the alarm motor.

Another feature of the present invention is that it further includes a wire connecting the alarm motor to the module.

Yet another feature of the present invention is that it further includes a wire connecting the alarm motor to the key switch.

Still another feature of the present invention is that the wire is heavy black.

Yet still another feature of the present invention is that it further includes a hood switch.

Still yet another feature of the present invention is that it further includes a wire connecting the module to the hood switch.

Another feature of the present invention is that the wire is thin black.

Yet another feature of the present invention is that the key switch contains two terminals.

Still another feature of the present invention is that it further includes a wire connecting the module to one of the two terminals of the key switch and then to the alternator terminal of the battery.

In keeping with these objects, and with others which will become apparent hereinafter, one feature of the present invention resides, briefly stated, in a method for installing a device for shutting off an engine remotely and sounding an alarm locally, including the steps of selecting a place under the hood and mounting the siren so that it will be cleanly grounded. If necessary, clean and the sand metal where the holes will be drilled before fastening with bolts supplied.

The lock is mounted on the fender by drilling a ¾' hole or the lock could be mounted hidden by grille. The yellow wire is connected from the module to the terminal of the key switch. The positive battery terminal is removed and cut off. Slide the induction module over the cable. Put the new terminal, furnished, over the cable. Select a convenient location for mounting the module which has a good ground. Use stud and nuts to hold the module firmly.

Another feature of the present invention is that it further includes the step of mounting the lock on the fender by drilling a ¾' hole can be replaced hiding the lock behind the grille.

The novel features which are considered characteristic for the invention are set forth in particular in the appended claims. The invention itself, however, both as to its construction and its method of operation, together with additional objects and advantages thereof, will be best understood from the following description of the specific embodiment when read in connection with the accompanying drawing.

BRIEF DESCRIPTION OF THE DRAWING

FIG. 7 is a narrow schematic of the alarm portion of the present invention.

LIST OF REFERENCE NUMERALS UTILIZED IN THE DRAWING

Figure 1:
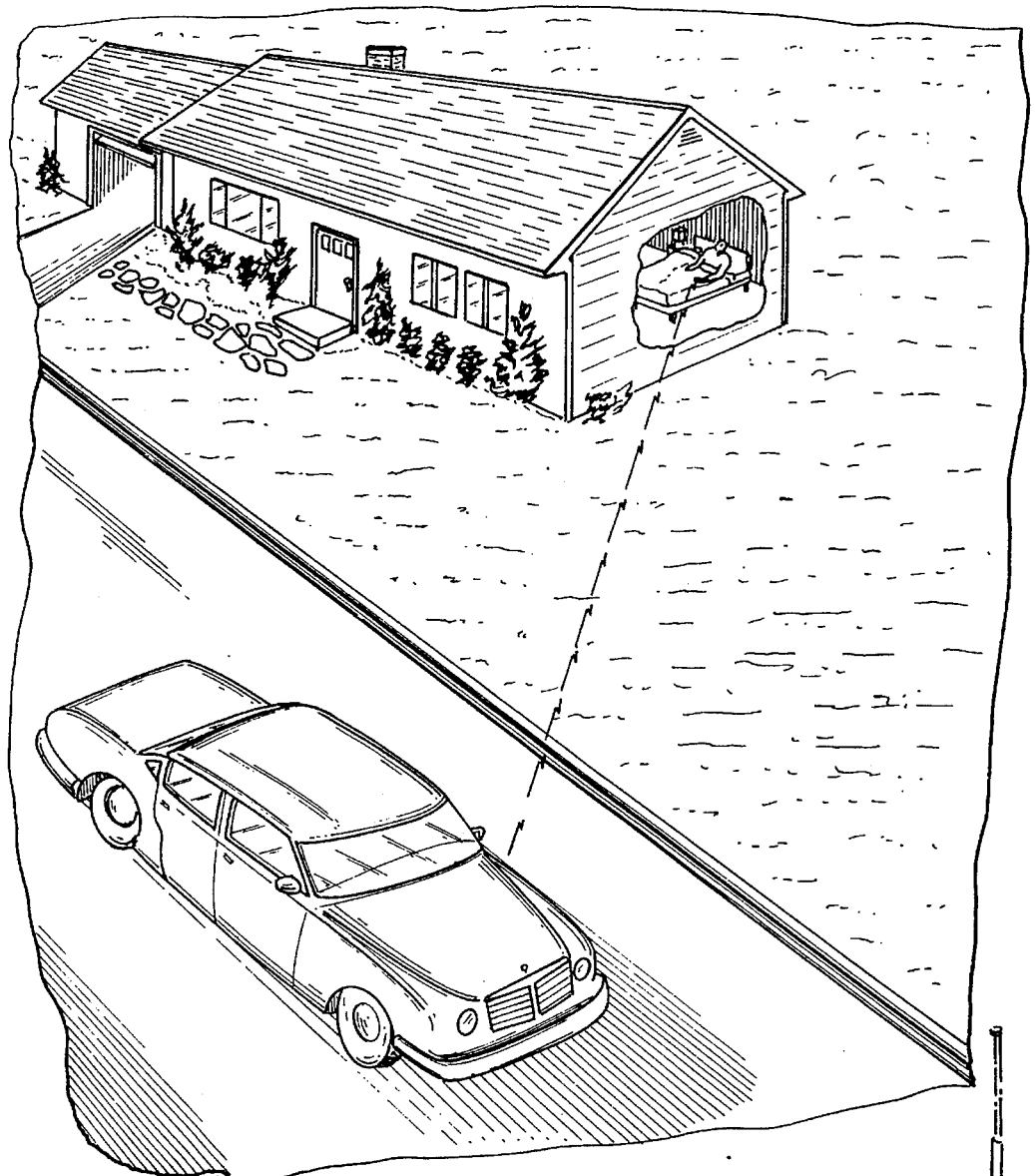
FIG. 1 is a perspective view showing a user using the present invention to stop the theft of his car.

10—system alarm of the present invention
12—alarm motor
14—module
15—heavy black wire connecting the alarm motor 12 to the key switch 16
16—key switch
18—siren
20—mounting bracket
22—wire connecting the alarm motor 12 to the module 14
24—thin black wire connecting the module 14 to the hood switch
26—terminal of the key switch 16
28—terminal of the key switch 16
30—yellow wire the module 14 to the terminal 28
34—green wire
36—red wire which plugs into the power source
38—black wire which goes to ground

DETAILED DESCRIPTION OF THE PREFERRED EMBODIMENT

For the purposes of promoting an understanding of the principles of the present invention, reference will now be made to the embodiment illustrated in the drawing and specific language will be understood that no limitation of the scope of the present invention is thereby intended, such alterations and further modifications in the illustrated device, and such further applications of the principles of the present invention as illustrated therein being contemplated as would normally occur to one skilled in the art to which the present invention relates.

Auto thefts are at an all-time high, almost 60% of all cars stolen are by young "joy riders". But with the installation of the present invention, the thief will be scared away before he can do any damage, let alone take the car. This can be seen in FIG. 1.

After setting the alarm, if anyone opens up the door or trunk, the alarm will go off and the engine will be stopped. If entry is made through a window and the ignition switch is turned or the brake pedal is stepped on or the glove compartment opened or the light turned on, the alarm will go off.

Any activation of the electrical system, and the alarm will go off. (however, no signal will be transmitted because of normal variations in battery voltage due to temperature changes or the state of battery charge or an auto clock.)

The unique design of the present invention auto alarm (Wise Guard) incorporates a built in induction coil which makes the system sensitive to the slightest variation in voltage drop unlike other units which are not built with the same technical skill.

There are no relays in the present invention everything is solid state. The present invention auto alarm is 100% reliable.

In essence, what occurs when you press the remote control, it cuts off the ignition and sets off the alarm. The battery cable passes through the alarm module and any drop in current will set the alarm off. When the button on the remote control is again pressed, the alarm is shut off and the ignition is back to the on position. When the switch is made the alarm is activated. When the button is pushed the ignition is locked, at the same time there's another wire that brings in the alarm.

Referring now to the drawing wherein like numerals are used to designate like parts throughout and which illustrate a presently preferred electric system for remotely stopping an internal combustion engine and starting an alarm.

Figure 2:
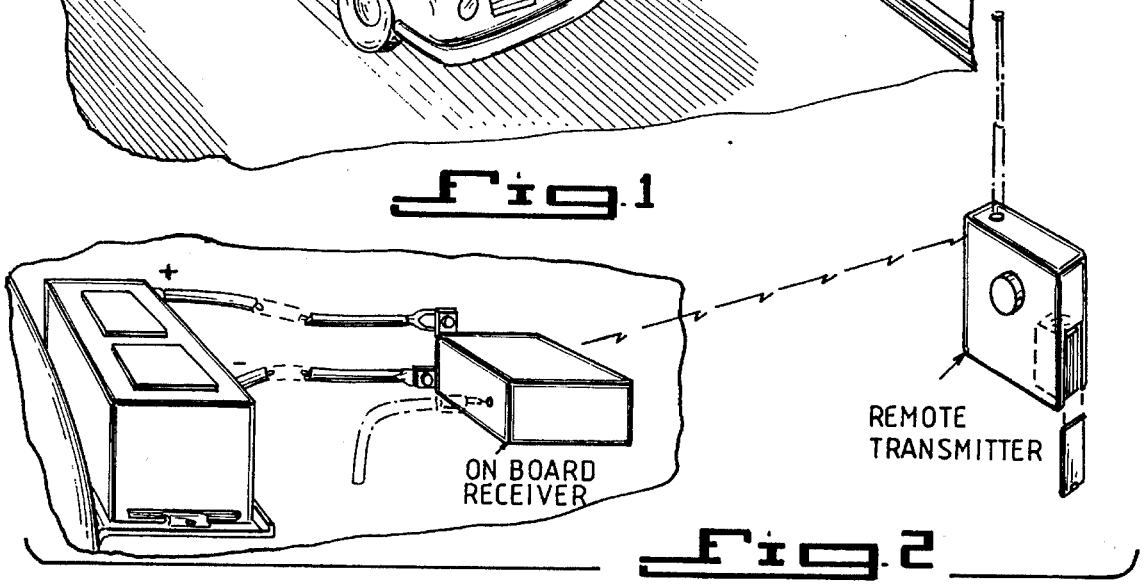
FIG. 2 is a perspective view of the receiver being wired to the battery and a remote transmitter sending out signals picked up by the receiver.

FIG. 2 is a perspective view of the receiver being wired to the battery and a remote transmitter sending out signals picked up by the receiver.

Figure 3:
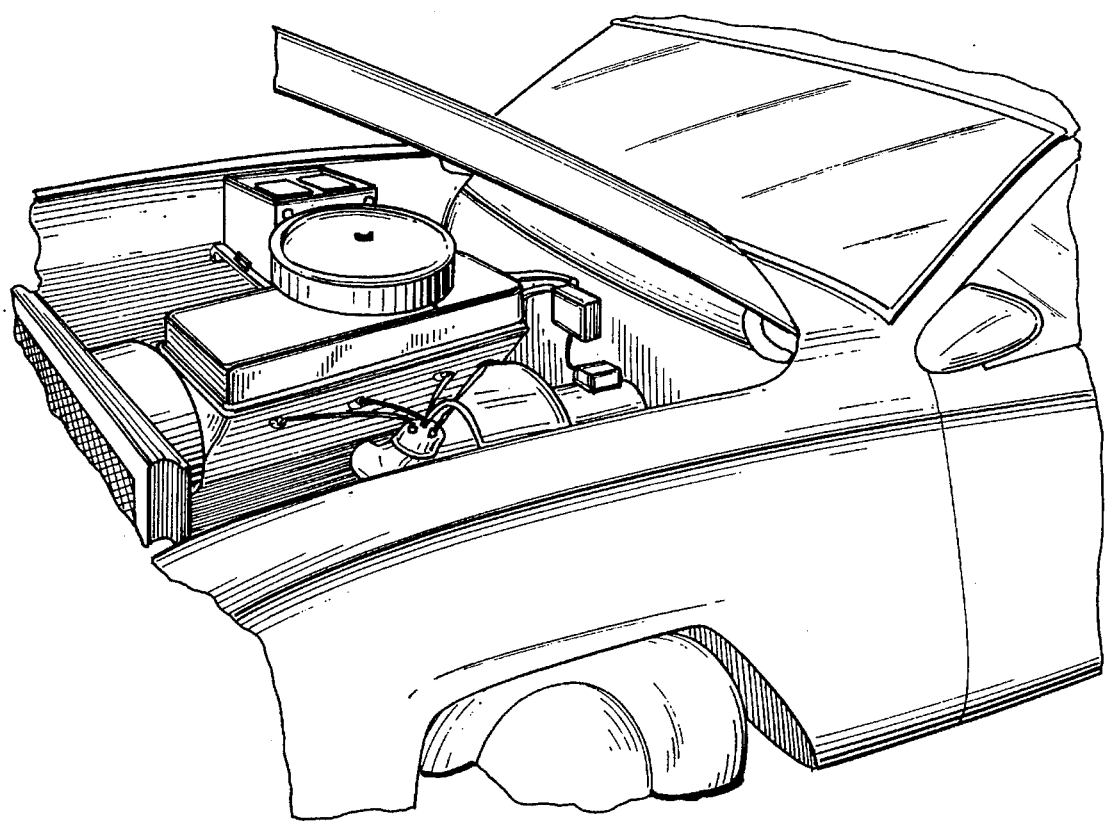
FIG. 3 is a perspective view of the present invention being installed in the engine compartment of the automobile.

FIG. 3 is a perspective view of the present invention being installed in the engine compartment of the automobile.

Figure 4:
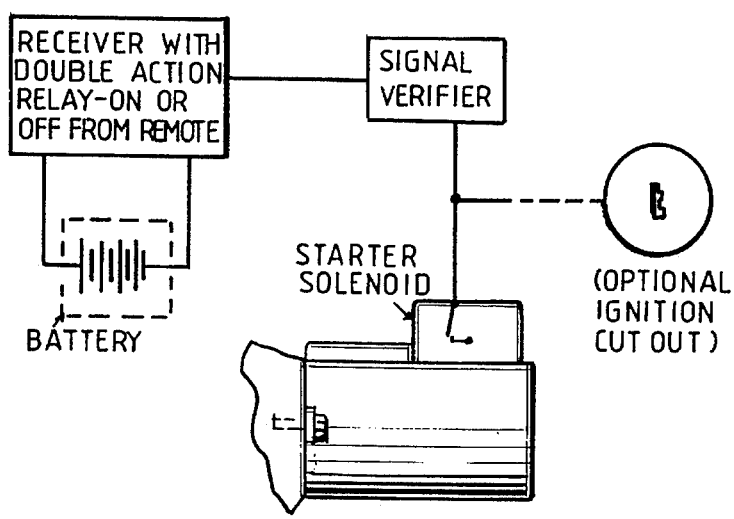
FIG. 4 is a broad schematic of the engine cut off portion of the present invention.

FIG. 4 is a broad schematic of the engine cut off portion of the present invention.

Figure 5:
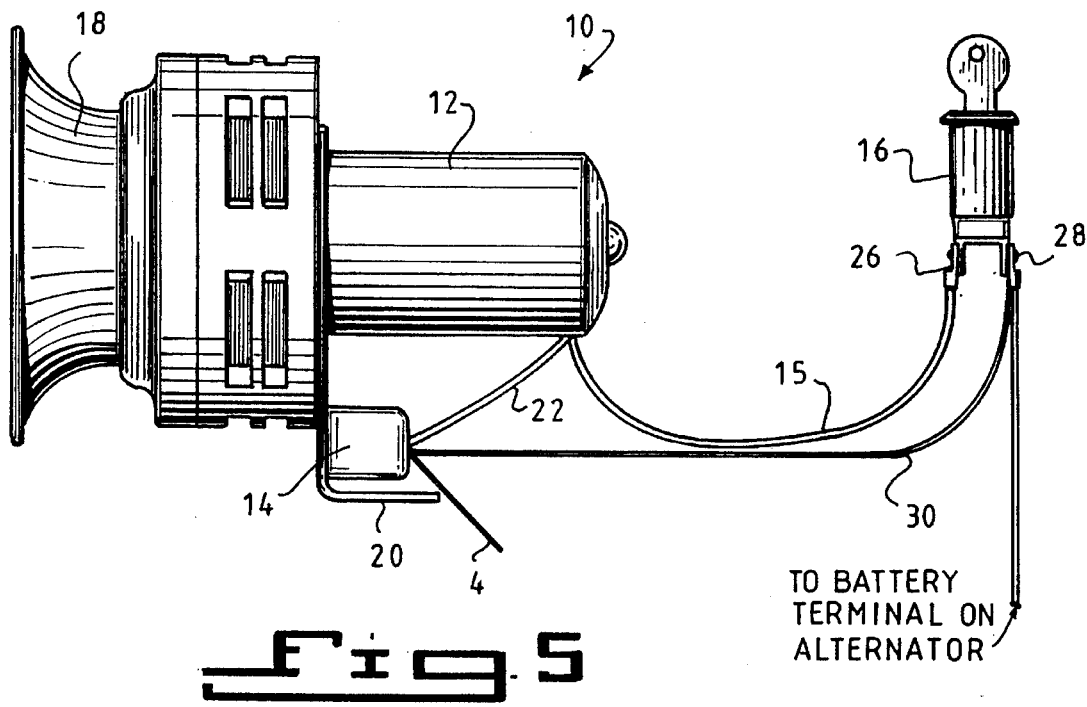
FIG. 5 is a simple schematic for mounting the alarm of the present invention.

FIG. 5 reflects the circuitry for the system alarm 10. The system alarm 10 includes an alarm motor 12, a module 14, a key switch 16, a siren 18, a mounting bracket 20, a wire 22 that connects the alarm motor 12 to the module 14, a heavy black wire 15 that connects the alarm motor 12 to the key switch 16, a thin black wire 24 that connects the module 14 to the hood switch (not shown in this figure).

The key switch 16 contains two terminal 26 and 28. The heavy black wire 15 is attached to the terminal 26 of the key switch 16. While the yellow wire 30 connects the module 14 to the terminal 28 of the key switch 16 and then to the alternator side of the battery (not shown in this figure).

Figure 6:
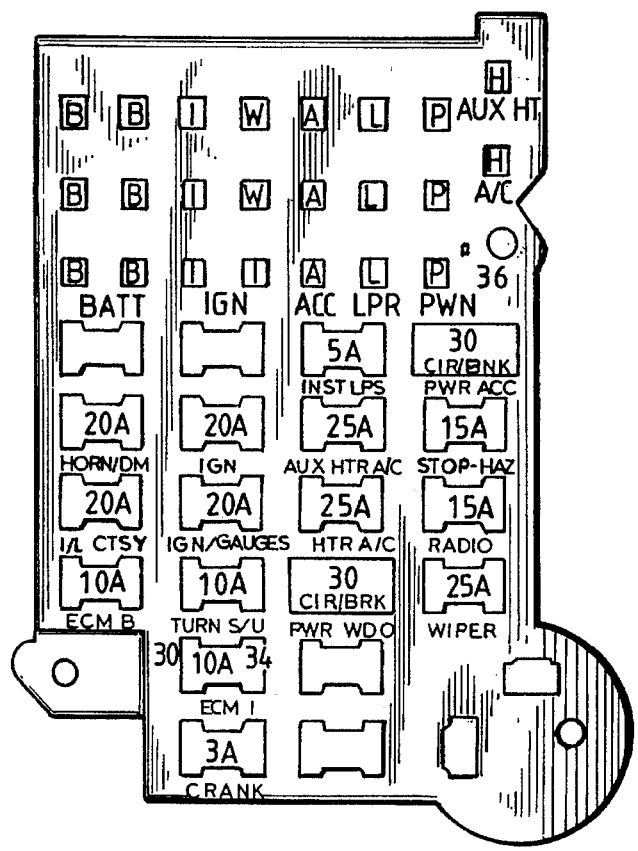
FIG. 6 is a plan view of the fuse box of an auto containing the present invention.

Accordingly, remove ignition fuse and plug in yellow wire 30 and green wire 34, as indicated on the fuse block chart, FIG. 6. The red wire 36 plugs into the power source, and the black wire 38 goes to ground.

The system is installed as follows:

Select a place under the hood and mount the siren 18 so that it will be cleanly grounded. (If necessary, clean and sand the metal where the holes will be drilled before fastening with the bolts supplied);

The lock is mounted on the fender by drilling a ¾' hole or mounted hidden by the grille;

Connect yellow wire 30 from the module 14 to the terminal 28 of the key switch 16;

Remove positive battery terminal, cut off terminal, slide induction module 14 over cable, put new terminal (furnished) over cable, select convenient location for mounting module 14. This must be a good ground. Use stud and nuts to hold firmly.

To protect the hood, install the hood switch which is already connected to the thin black wire 24 from the module 14.

To test installation, turn key 16 in lock then open the door-dome light or courtesy light causes a voltage drop and the siren 18 will go off. Open the trunk-trunk light causes a voltage drop and the siren 18 will go off. Turn on the ignition causes a voltage drop and the siren 18 will go off. Turn on the headlights causes a voltage drop and the siren 18 will go off. Step on the brake-brake light causes a voltage drop and the siren 18 will go off. Open the glove door causes a voltage drop and the siren 18 will go off. Even on a convertible, protection is assured. Creating a voltage drop across the car battery is what make the siren 18 go off.

To protect the trunk lid opening where no light was originally installed, it is recommended that a trunk light kit be obtained—installation is simple.

The circuitry of the module 14 is shown in FIG. 7. The module comprises in series a capacitor, two transistors and silicon controlled rectifier connected to the alarm motor. The circuit contains an induction portion 12 that when a load is put across the battery it causes the siren 12 to be energized and go off, and to ground out the battery, so the auto stops.

It will be understood that each of the elements described above, or two or more together, may also find a useful application in other types of constructions differing from the type described above.

While the invention has been illustrated and described as embodied in an auto alarm device, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A security system for a vehicle having an internal combustion engine comprising:
   an alarm system comprising:
      a battery, an alarm motor, a key switch, an electronic control module, a siren;
      wherein said alarm motor is electronically linked to said electronic control module;
      said electronic control module comprises means for activating and deactivating said alarm motor;
      said key switch electronically linked to said alarm motor and said electronic control module; wherein said key switch comprises means for turning said electronic control module on and off, and means for testing installation comprising means for activating said siren when said key switch is in a lock position and a voltage drop is being caused by (a) opening a door-dome light, a courtesy light, a trunk light or a glove door; (b) turning on the ignition or headlights; or (c) stepping on a brake light;

said battery electronically linked to said siren, said key switch and said electronic control module being rechargeable by an alternator terminal;

a hand-held transmitter for transmitting a signal to an on-board receiver electronically linked to said battery, said key switch, said electronic control module and said siren; wherein said receiver comprising:

means for remotely cutting off said ignition and turning on said alarm system and setting the alarm system to an alarm mode by pressing a button of said hand-held transmitter by an operator;

means for remotely turning on said ignition and shutting off said alarm system when said button of said hand-held transmitter is pressed again by said operator;

during said alarm mode, said control module comprises an induction portion, and means to detect a voltage drop or any drop in current flow from the battery in said vehicle, a battery cable passing through said control module for providing said current flow, means for activating said alarm motor and said siren and ground out the battery in response to a predetermined drop in said current flow; wherein said predetermined drop in said current flow is caused by opening a hood of said vehicle, or opening a door, or opening a trunk, or turning on the ignition or headlights, or stepping on a brake, or when a load is put across the battery;

wherein said key switch mounted in a vehicle fender or hidden behind the vehicle grille;

and said electronic control module comprising in series a capacitor, two transistors and a silicon controlled rectifier connected to said alarm motor.

\* \* \* \* \*